AUTOMATIC TELEPHONE MESSAGE ACCOUNTING SYSTEM

Filed Sept. 4, 1947 13 Sheets-Sheet 1

INVENTORS: J. W. DEHN
E. VROOM
BY R. Marino
ATTORNEY

AUTOMATIC TELEPHONE MESSAGE ACCOUNTING SYSTEM

Filed Sept. 4, 1947 13 Sheets-Sheet 2

INVENTORS: J. W. DEHN
E. VROOM
BY R. Marino
ATTORNEY

AUTOMATIC TELEPHONE MESSAGE ACCOUNTING SYSTEM

Filed Sept. 4, 1947 13 Sheets-Sheet 3

INVENTORS: J. W. DEHN
E. VROOM
BY R. Marino
ATTORNEY

AUTOMATIC TELEPHONE MESSAGE ACCOUNTING SYSTEM

Filed Sept. 4, 1947

INVENTORS: J. W. DEHN
E. VROOM
BY R. Marino
ATTORNEY

Dec. 25, 1951 J. W. DEHN ET AL 2,579,729

AUTOMATIC TELEPHONE MESSAGE ACCOUNTING SYSTEM

Filed Sept. 4, 1947 13 Sheets-Sheet 5

INVENTORS: J. W. DEHN
E. VROOM
BY R. Marino
ATTORNEY

Dec. 25, 1951 J. W. DEHN ET AL 2,579,729

AUTOMATIC TELEPHONE MESSAGE ACCOUNTING SYSTEM

Filed Sept. 4, 1947 13 Sheets-Sheet 6

INVENTORS: J. W. DEHN
E. VROOM

BY R. Marino

ATTORNEY

AUTOMATIC TELEPHONE MESSAGE ACCOUNTING SYSTEM

INVENTORS: J.W. DEHN
E.VROOM
BY R. Marino
ATTORNEY

AUTOMATIC TELEPHONE MESSAGE ACCOUNTING SYSTEM

Filed Sept. 4, 1947

INVENTORS: J. W. DEHN
E. VROOM
BY R. Marino
ATTORNEY

AUTOMATIC TELEPHONE MESSAGE ACCOUNTING SYSTEM

Filed Sept. 4, 1947 13 Sheets-Sheet 9

INVENTORS: J. W. DEHN
E. VROOM
BY R. Marino
ATTORNEY

AUTOMATIC TELEPHONE MESSAGE ACCOUNTING SYSTEM

Filed Sept. 4, 1947 13 Sheets-Sheet 10

INVENTORS: J. W. DEHN
E. VROOM
BY R. Marino
ATTORNEY

AUTOMATIC TELEPHONE MESSAGE ACCOUNTING SYSTEM

Filed Sept. 4, 1947

INVENTORS: J. W. DEHN
E. VROOM
BY R. Marino
ATTORNEY

Dec. 25, 1951 J. W. DEHN ET AL 2,579,729

AUTOMATIC TELEPHONE MESSAGE ACCOUNTING SYSTEM

Filed Sept. 4, 1947 13 Sheets-Sheet 12

INVENTORS: J. W. DEHN
E. VROOM

BY R. Marino

ATTORNEY

AUTOMATIC TELEPHONE MESSAGE ACCOUNTING SYSTEM

Filed Sept. 4, 1947

INVENTORS: J. W. DEHN
E. VROOM
BY R. Marino
ATTORNEY

Patented Dec. 25, 1951 2,579,729

UNITED STATES PATENT OFFICE 2,579,729

AUTOMATIC TELEPHONE MESSAGE ACCOUNTING SYSTEM

Joseph W. Dehn, Great Neck, and Edward Vroom, Ossining, N. Y., assignors to Bell Telephone Laboratories, Incorporated, New York, N. Y., a corporation of New York Application September 4, 1947, Serial No. 772,186

8 Claims. (Cl. 179—7.1)

This invention relates to telephone systems and more particularly to automatic message accounting systems for telephone service.

The information required for billing telephone calls ordinarily includes for each call, an indication of the subscriber to whom the call is to be charged, a record of the number called, from which the charges for the call may be determined, the time of answer of the called party, and the time of termination of the connection. The number called can best be obtained when the call is originated, while the time of answer and the time of termination, cannot, of course, be recorded until those events occur. Three separate record entries are, therefore, required for each call. To bill the subscribers, the three entries of each call must be assembled and, of course, the completed call records sorted in accordance with the subscribers to whom the calls are to be charged. In some systems, the entries are recorded seriatim, as received, on a continuous record. Special devices must then be employed to assemble the entries and sort the call records by a series of transcriptions.

The present invention discloses an automatic message accounting system for telephone offices in which a separate card, of a type commonly used for accounting purposes, is made for each entry of each call. Each card contains a record of the directory number of the calling line. These separate cards may be sorted, by well-known types of sorting machines, in accordance with the directory number recorded in each and, therefore, in accordance with the subscribers to whom the calls are chargeable. The three cards relating to each call are then readily assembled and the complete record for each subscriber is adapted to the use of well-known types of billing machines for the production of the subscribers' bills.

The features of the invention and its mode of operation will be apparent from the accompanying description, the appended claims, and the drawings, in which:

Figures 1, 14:
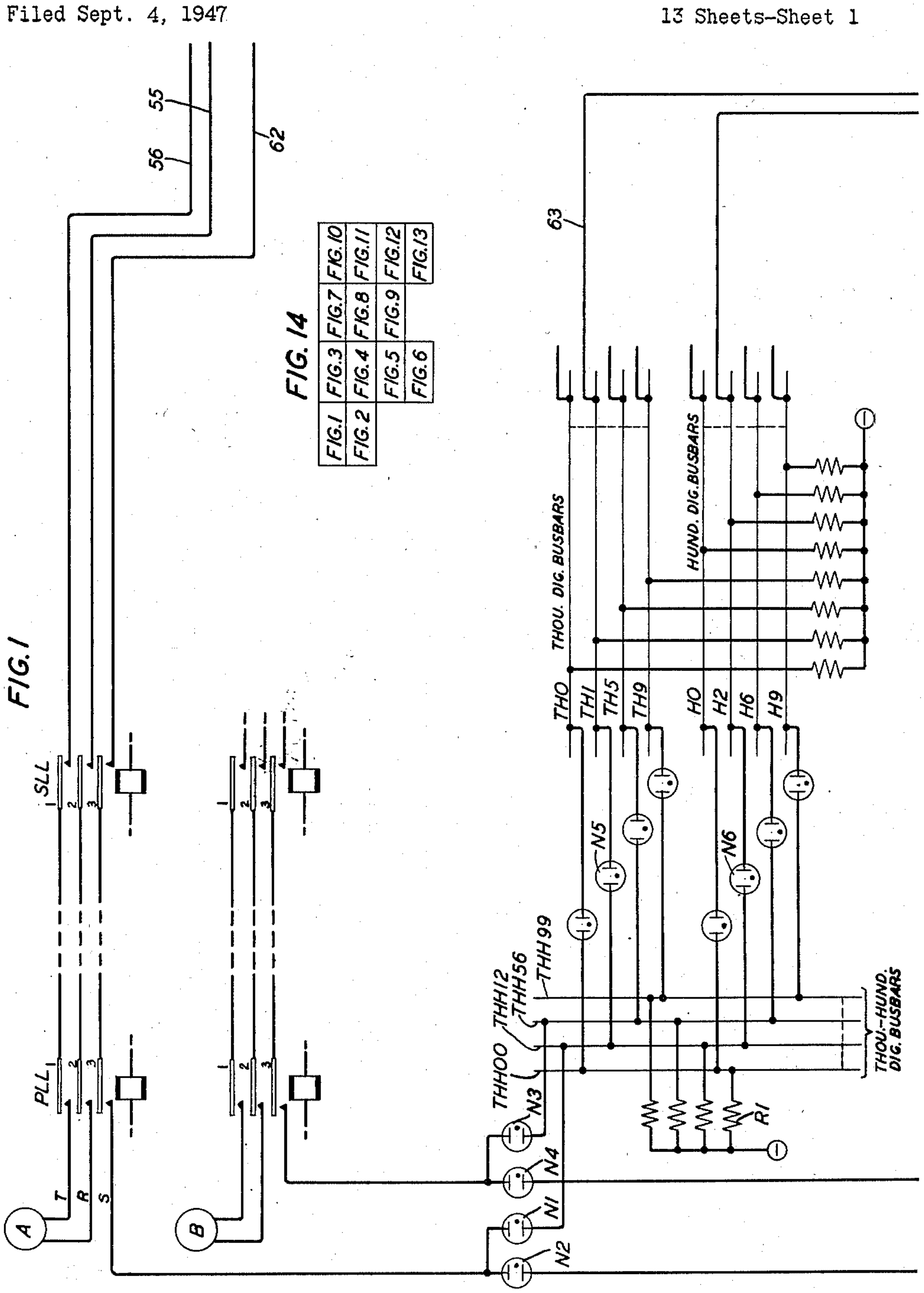
Fig. 1 shows subscribers' lines and a portion of the calling-line identifier circuit.
Fig. 14 shows how the above figures should be placed in relation to one another to completely disclose the invention.
Figure 3:
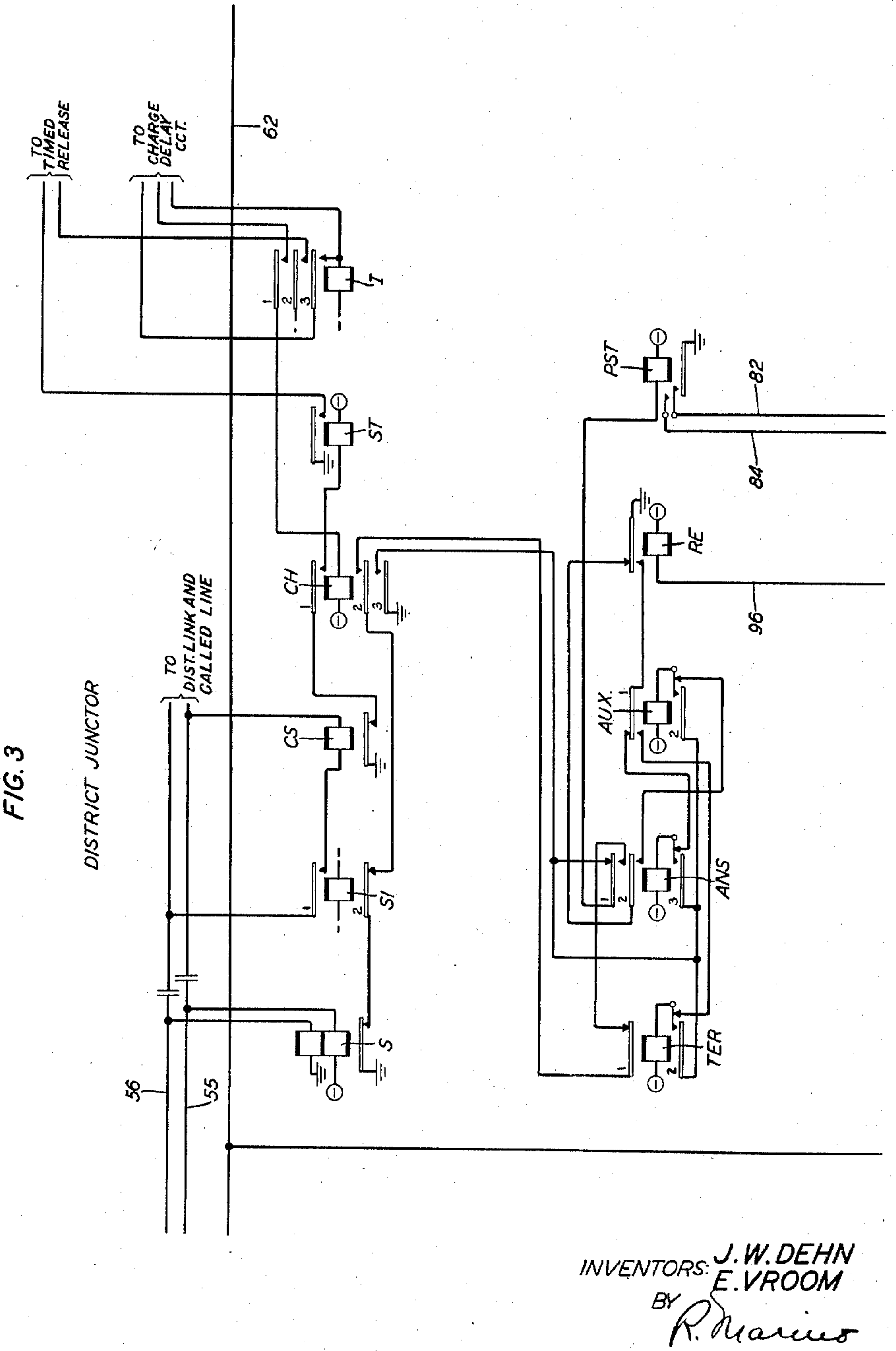
Fig. 3 shows so much of a district junctor circuit as is necessary for an understanding of the invention.
Figure 12:
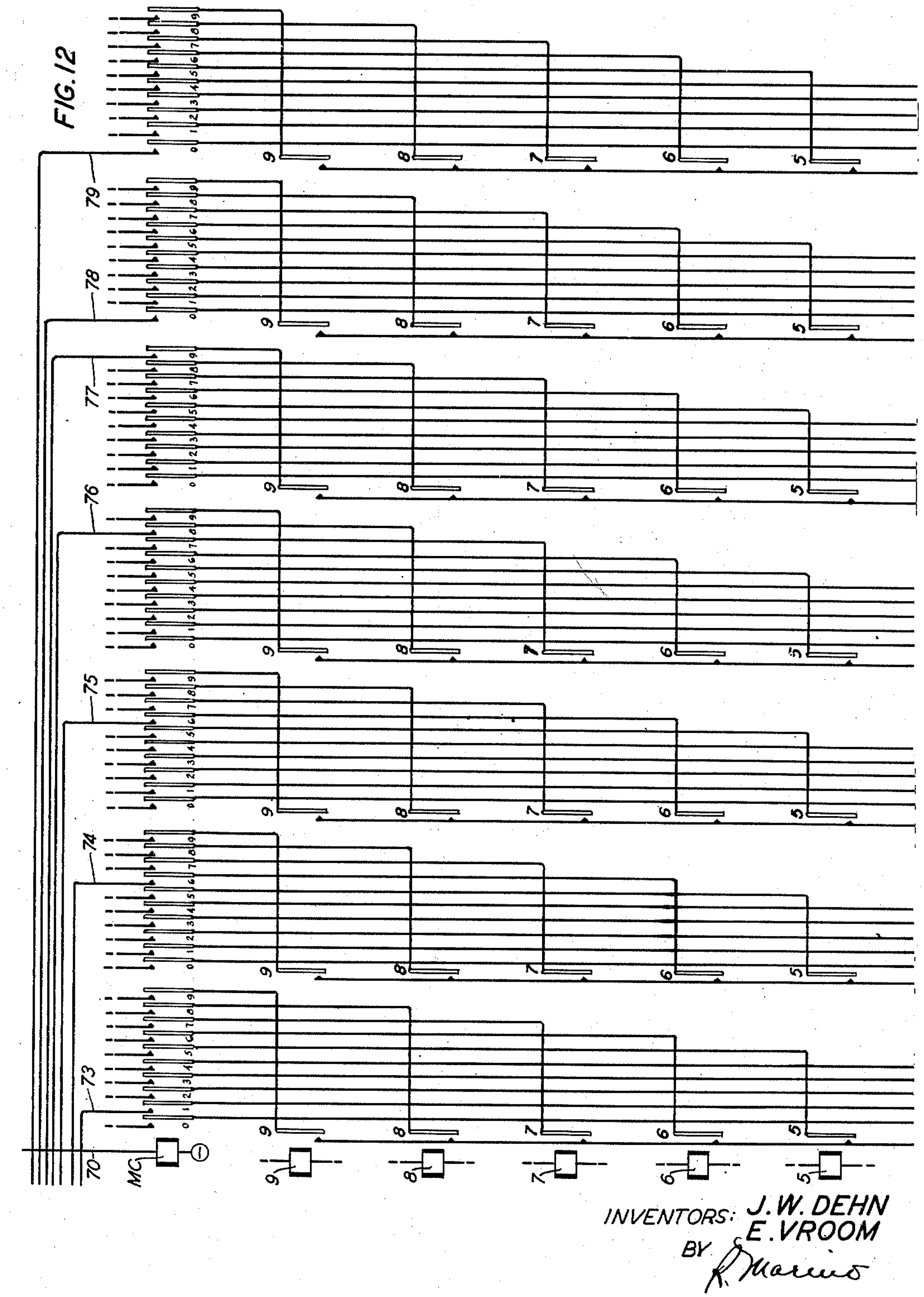
Figs. 12 and 13 show the register switches of the sender.
Figure 13:
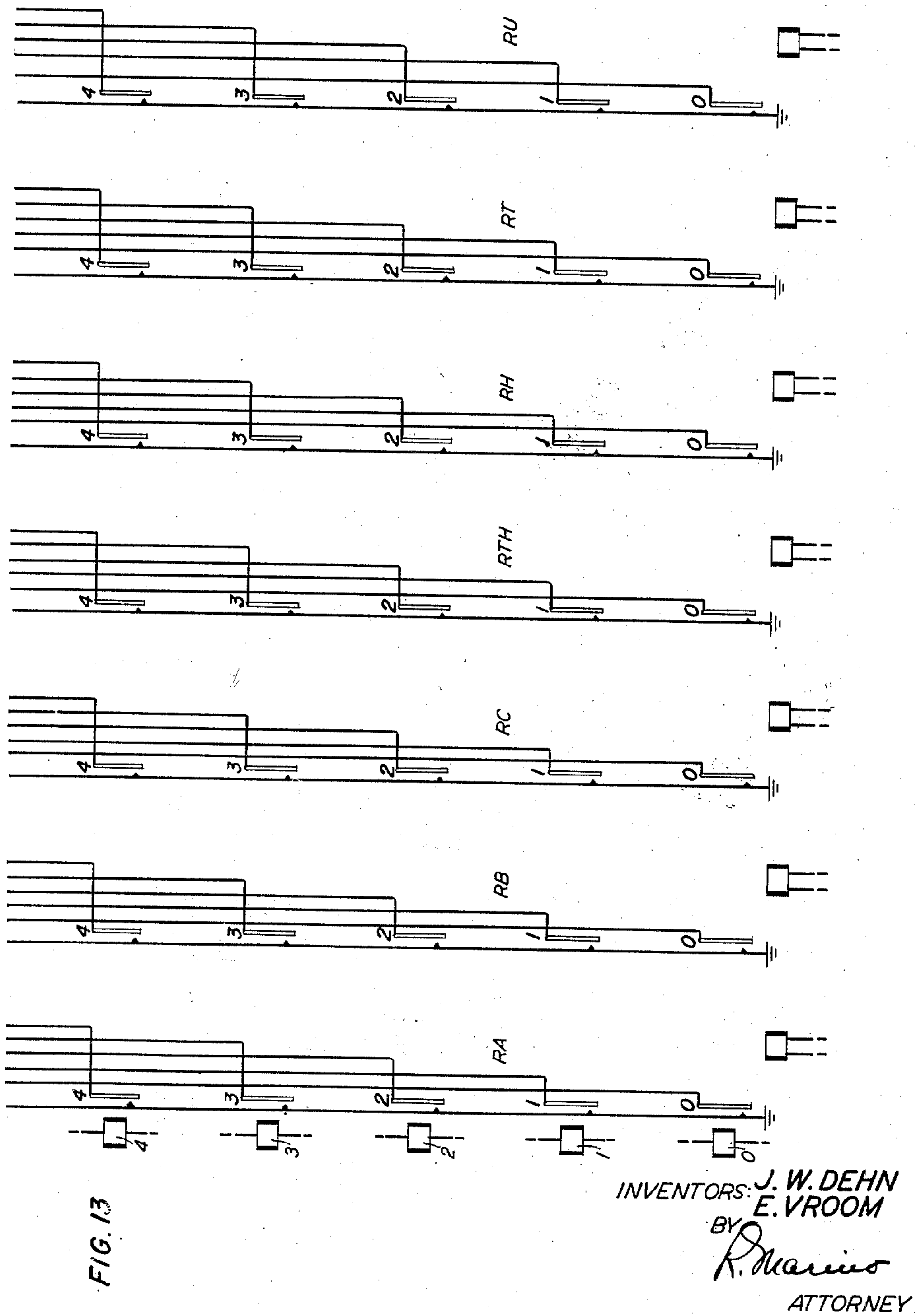

In the operation of the usual dial telephone system, when a subscriber originates a call by removing the receiver at his station, his line is extended by switching devices to a district junctor and is also connected to a sender. The subscriber then dials the number of the station with which he desires a connection and said number is registered by register switches in the sender. In Fig. 1, A represents a subscriber's station and PLL and SLL are switches for extending the line of said station when a call is originated thereat. Fig. 3 shows portions of the circuit of the district junctor to which the line of station A is extended. Figs. 12 and 13 show the register switches of the sender which register the number dialed at station A.

Figure 5:
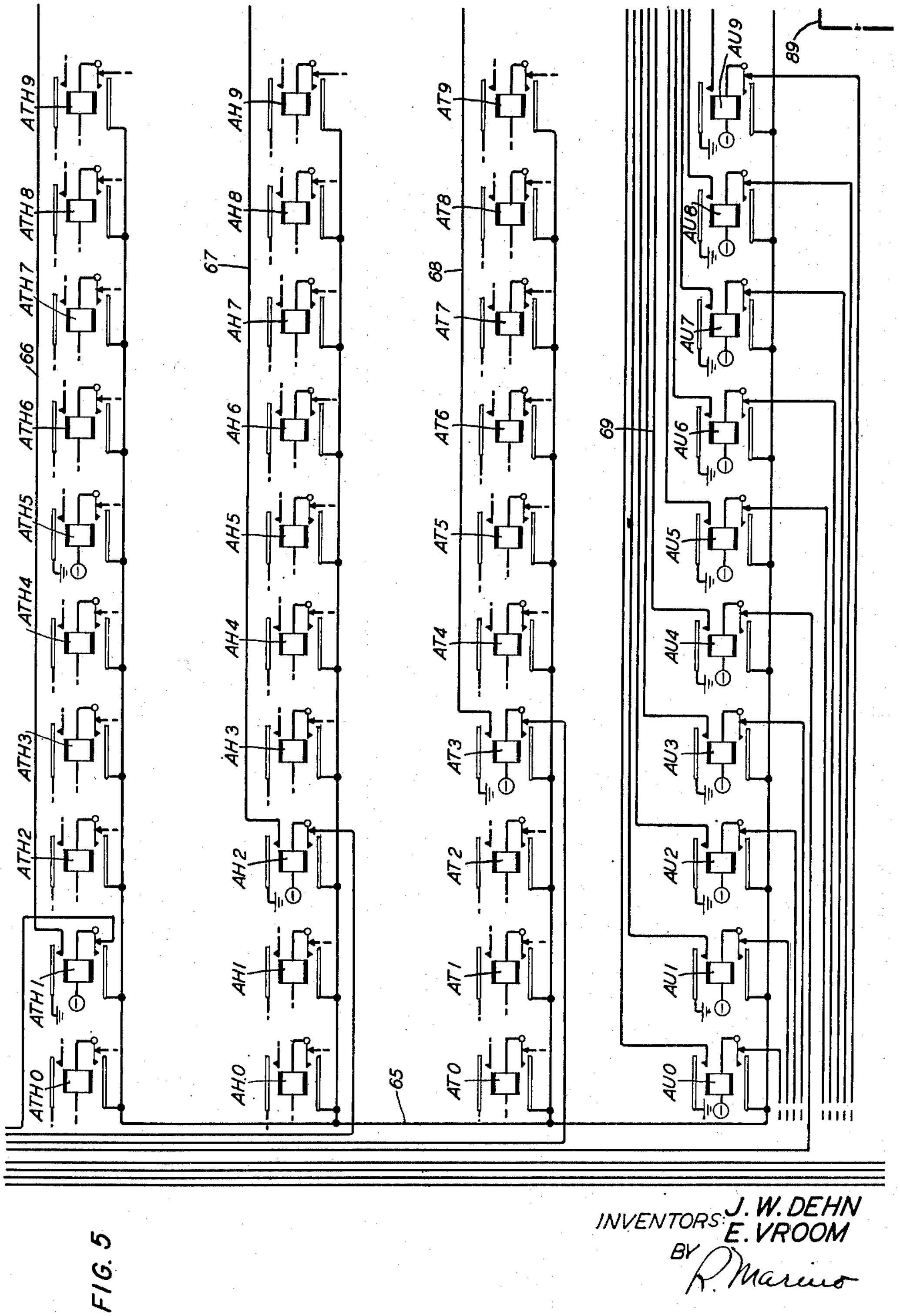
Figs. 5 and 6 show register circuits.
Figure 7:
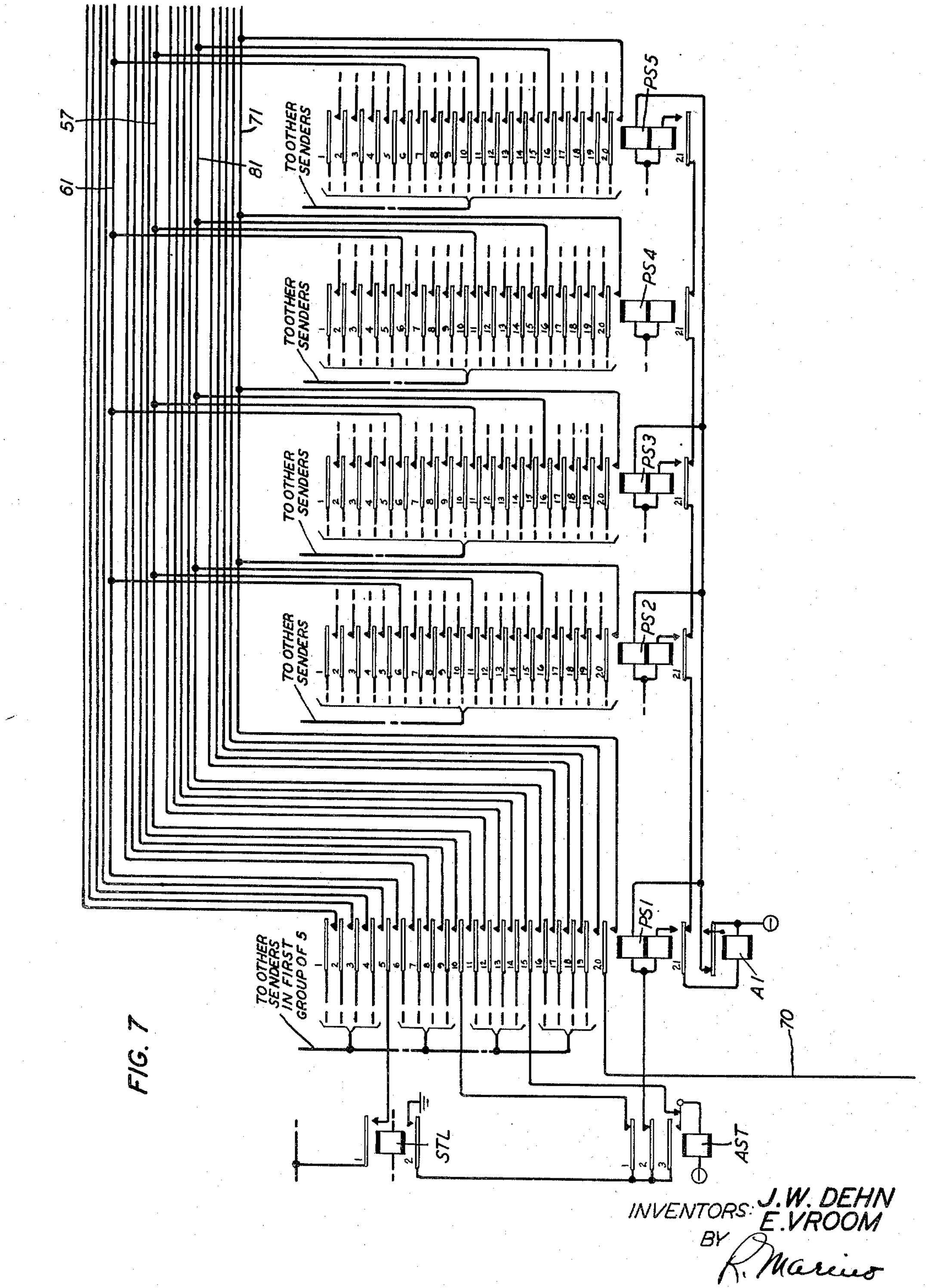
Figs. 7 and 10 show the sender connector circuit.
Figure 9:
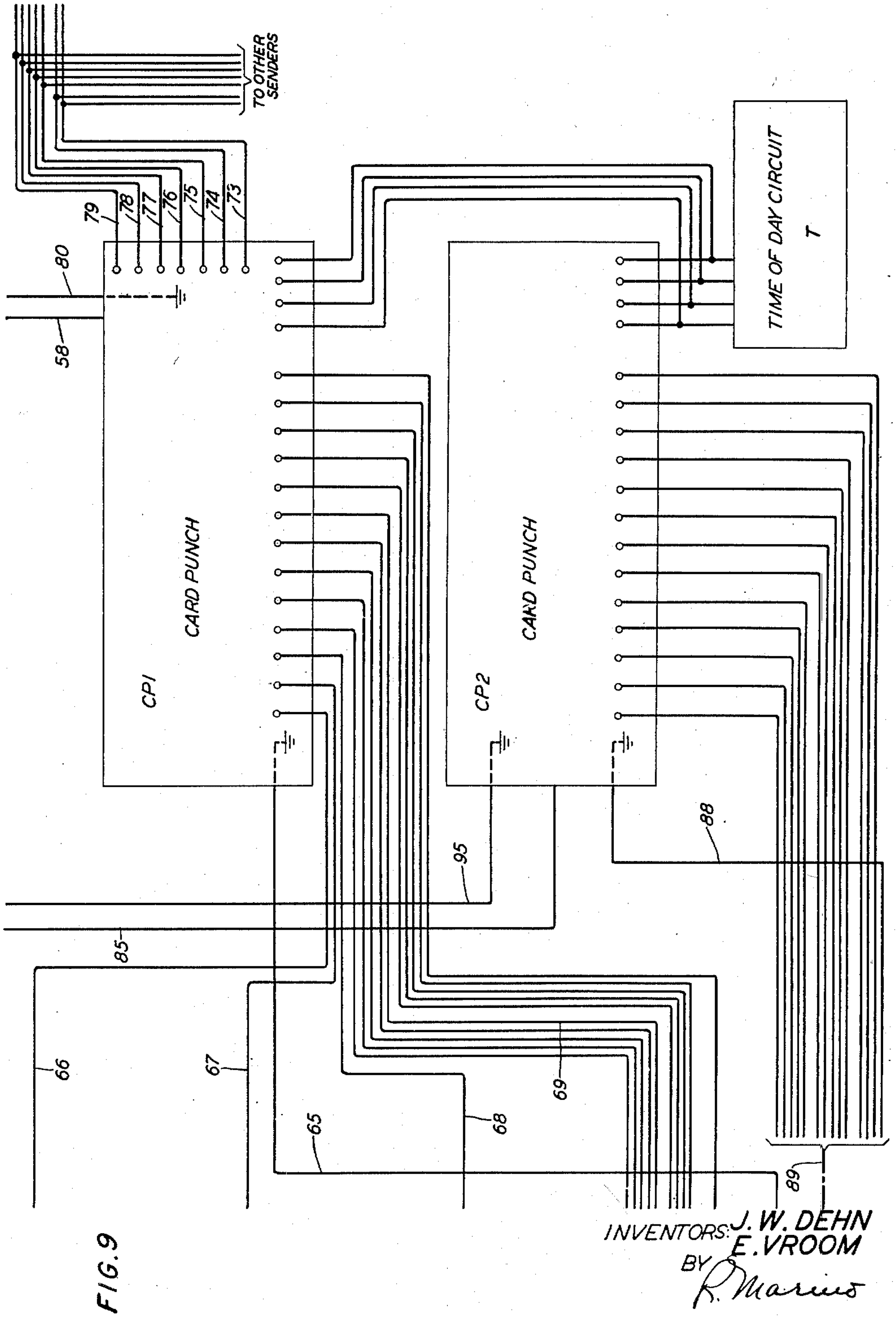
Fig. 9 shows diagrammatically two card punches and the time-of-day circuit.
Figure 10:
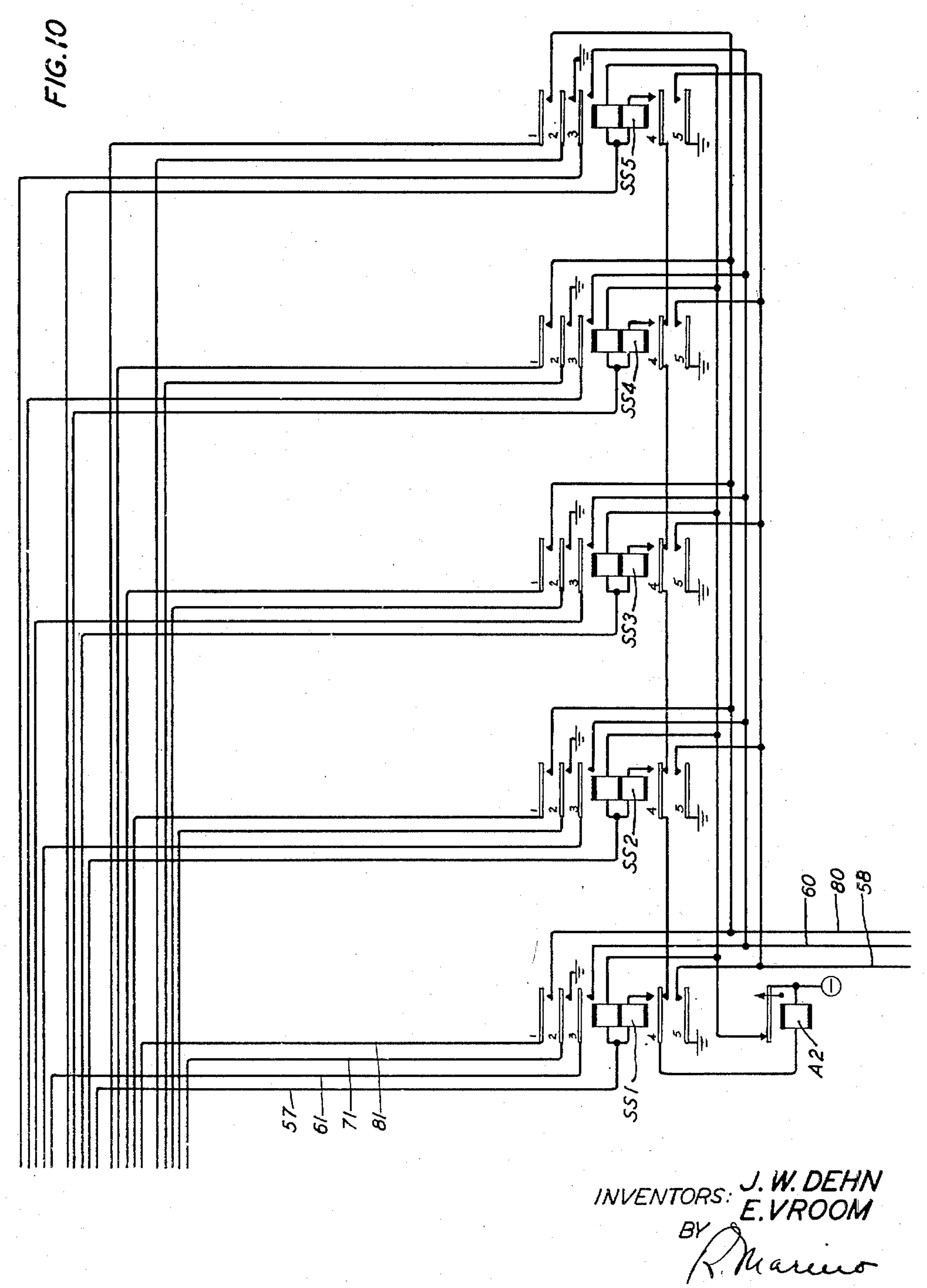
Figure 11:
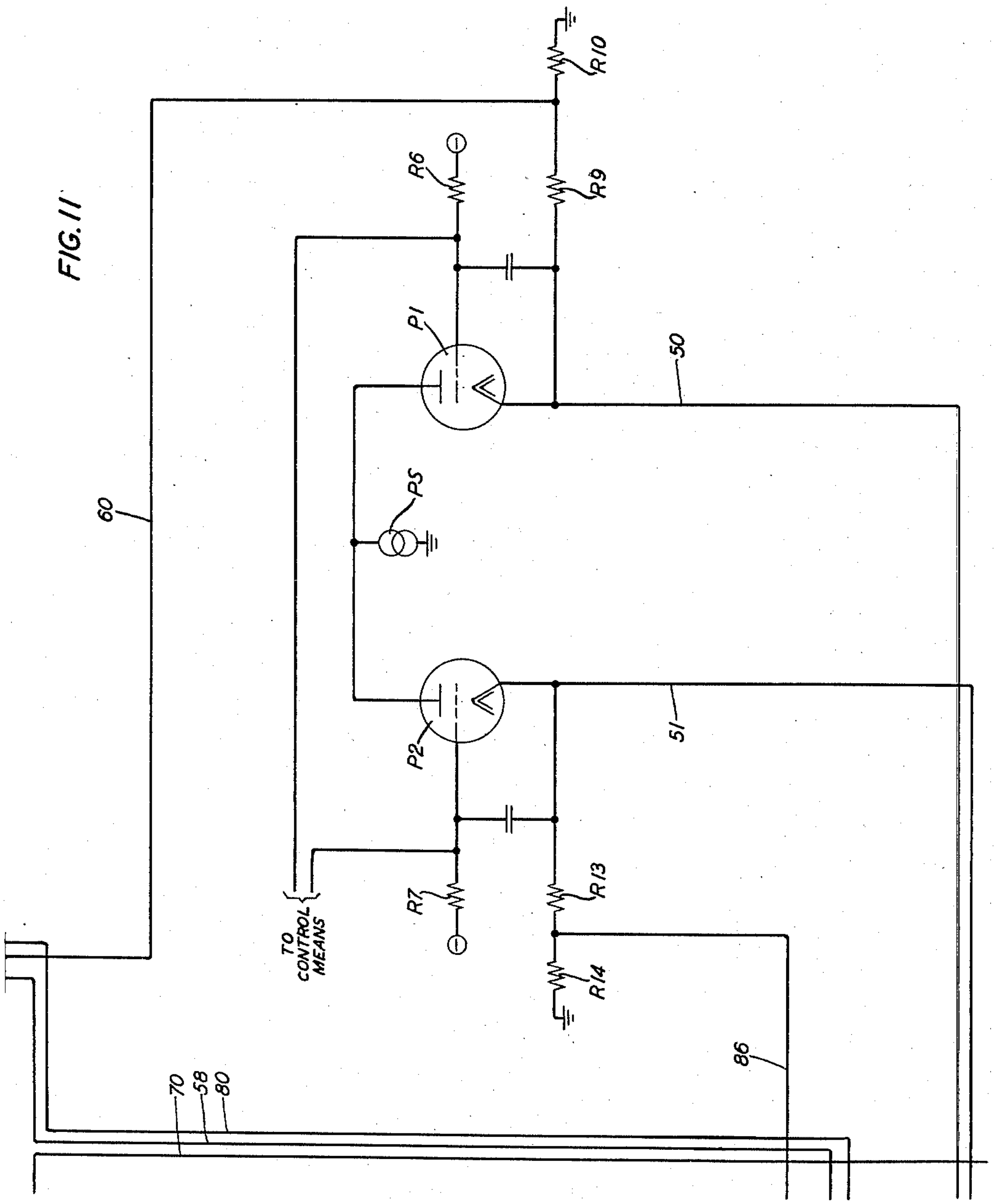
Fig. 11 shows the pulsing circuit.

In accordance with the present invention, when the number dialed by the calling subscriber has been registered in the sender, the sender connector circuit shown in Figs. 7 and 10 is actuated to put into operation the card punch CP1 of Fig. 9 and to connect to it conductors from the register switches of the sender. Said card punch is thereby caused to perforate a card with perforations corresponding to the number registered by the register switches of the sender which is, of course, the number of the called station. A pulse from the pulsing circuit shown in Fig. 11 is also transmitted over the sleeve conductor of the line of station A which actuates gas tubes in the identifier circuit shown in Figs. 1 and 2 to identify the calling line. Said gas tubes operate the register relays of Fig. 5 in combinations corresponding to the directory number of the calling line and the operated relays cause the card punch CP1 to perforate the card with corresponding perforations. A time-of-day circuit, indicated at T in Fig. 9 also causes the card punch CP1 to perforate the card with a record of the current time. By suitable means, the card punch CP1 may also be caused to record other desired information on the card, and it is obvious that, if a record of the called station is not required, it may be omitted. A similar card is made in the same way for each call, whether from station A or from another station.

Figure 4:
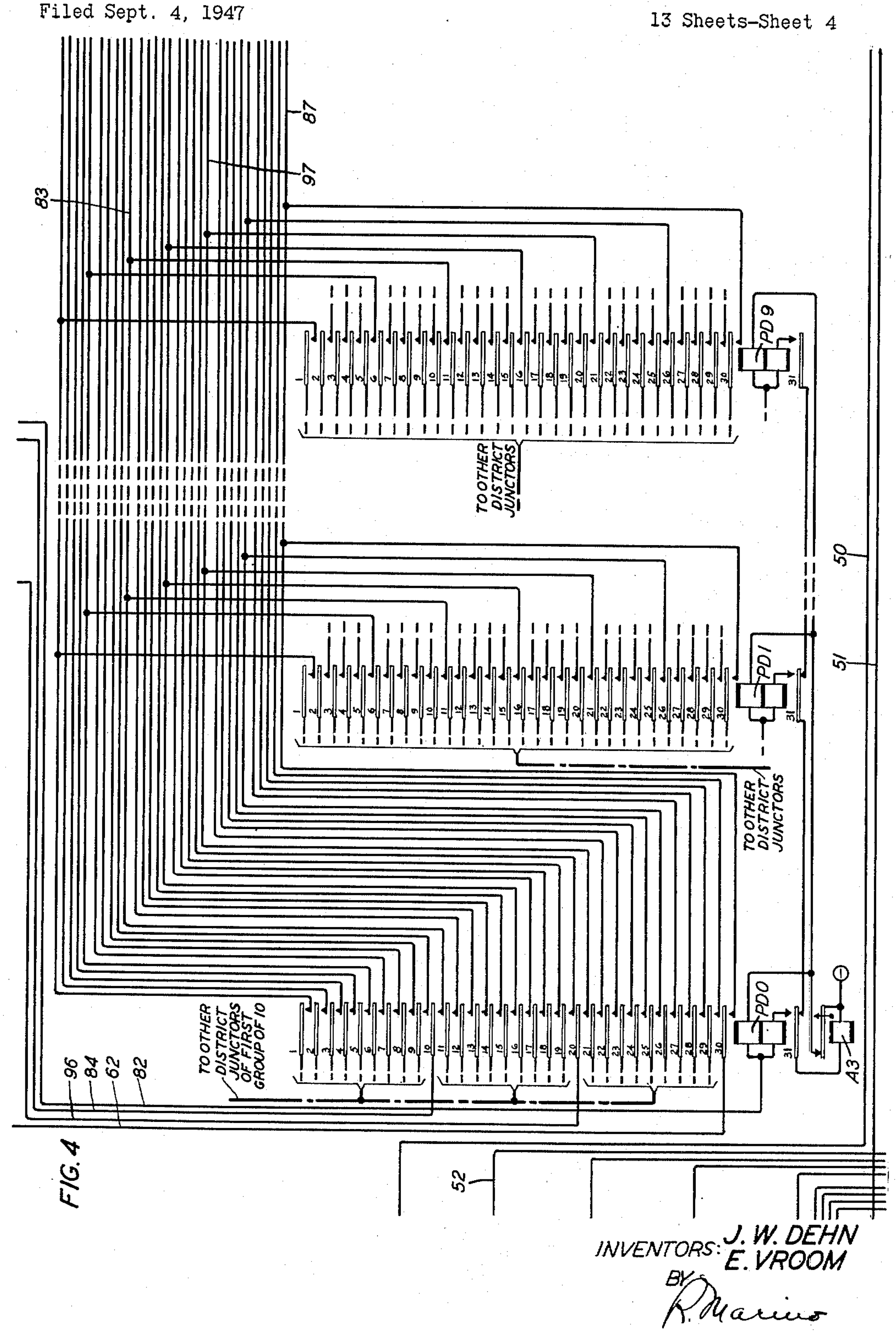
Figs. 4 and 8 show the district junctor connector circuit.
Figure 6:
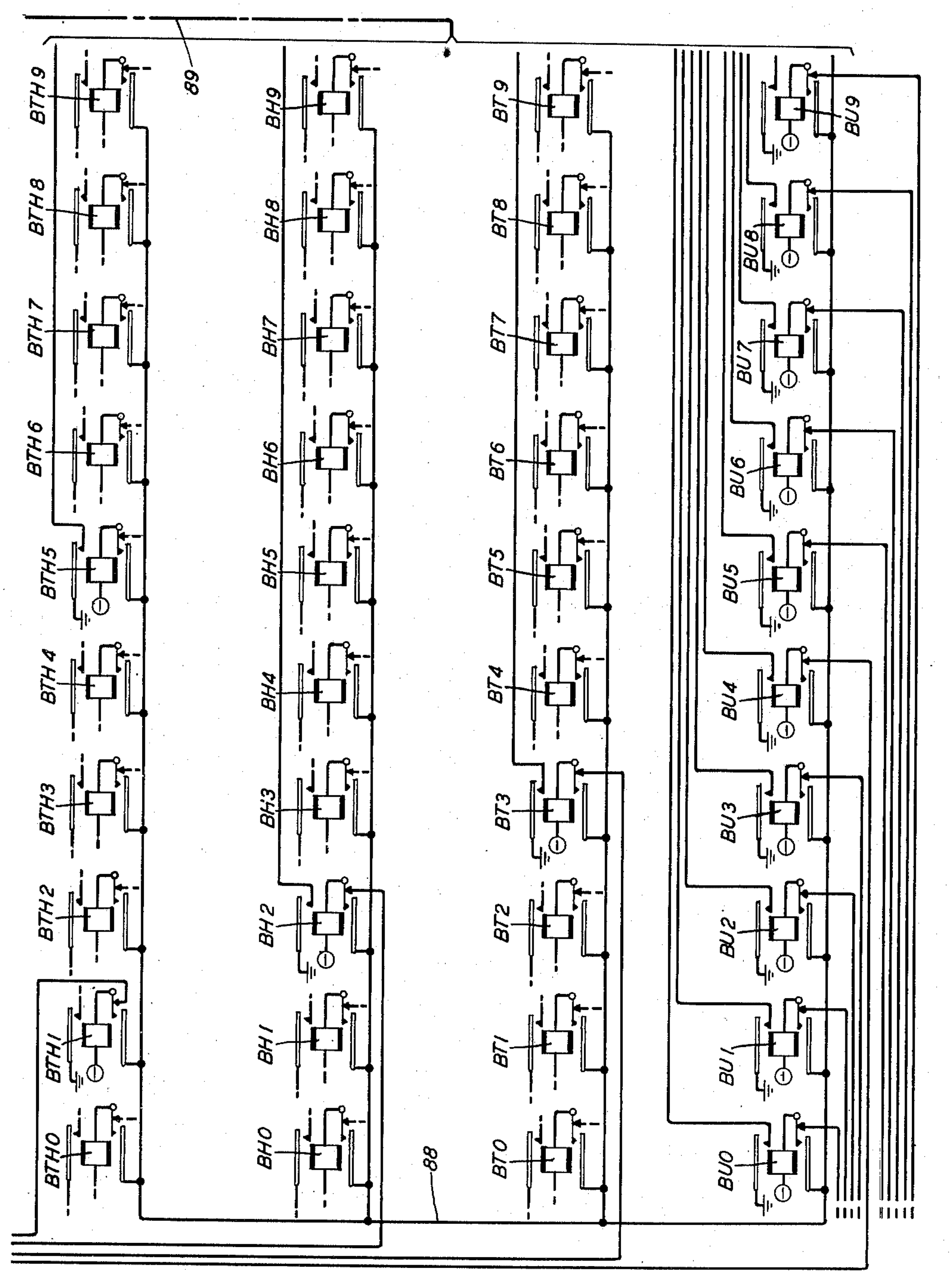
Figure 8:
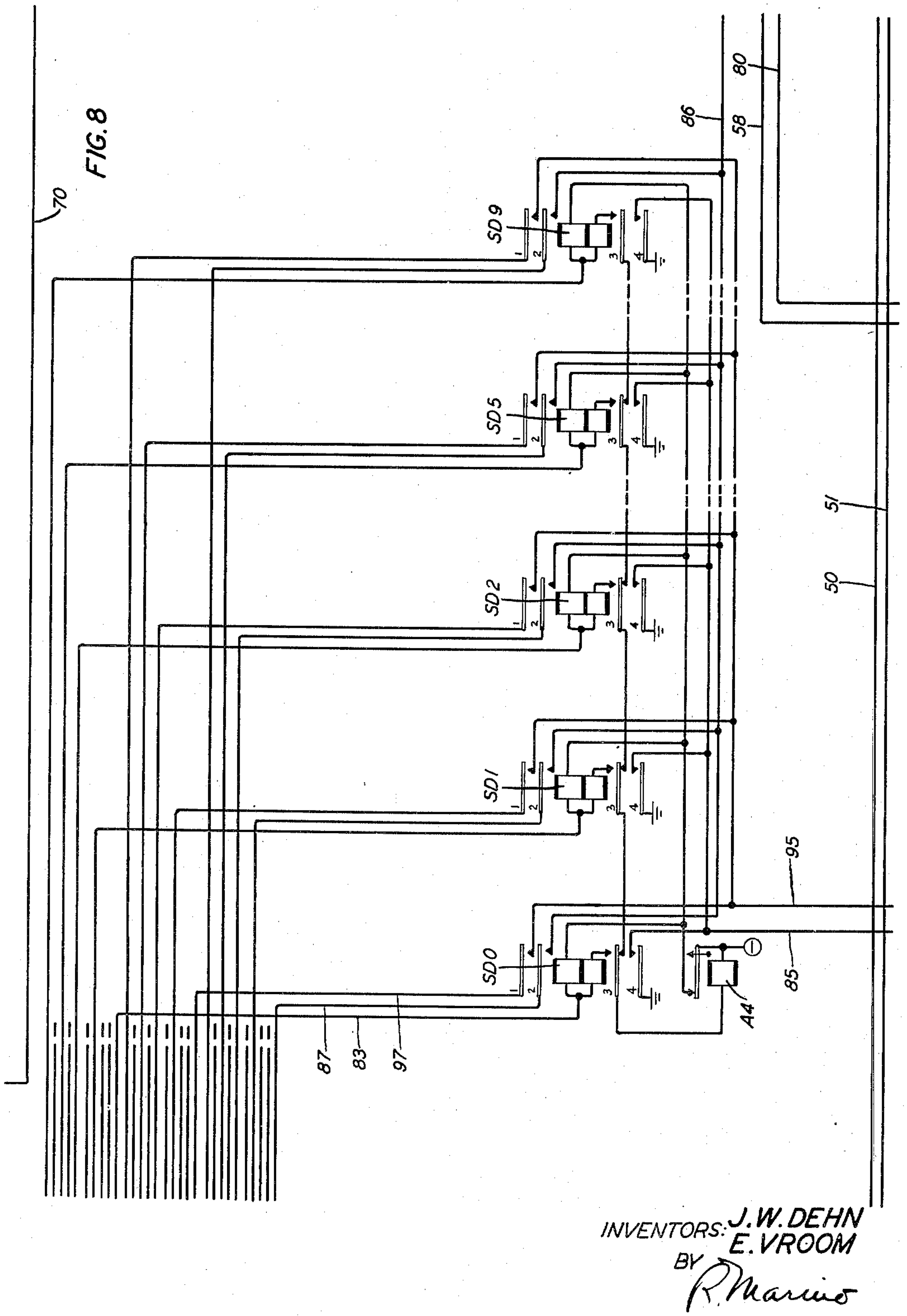

When the called subscriber answers, the usual answer signal causes the district junctor connector circuit shown in Figs. 4 and 8 to put into operation card punch CP2 of Fig. 9. A pulse from the pulsing circuit of Fig. 11 is also transmitted over the sleeve conductor of the line of station A which actuates gas tubes in the identifier circuits to identify the calling line, as before. Corresponding relays of the register relays shown in Fig. 6 are thereby operated to cause the card punch CP2 to perforate a card with a record of the number of the calling line. Said card punch is also controlled by the time-of-day circuit T to perforate the card with a record of the time of answer. Other information may, if desirable, be similarly recorded on the card by suitable means. A similar card is made in the same way for each call answered.

When the connection is terminated, the usual disconnect signal causes the district junctor connector circuit to put card punch CP2 again into operation for the perforating, in the manner described above, of another card with a disconnect record similar to the answer record and containing the number of the calling line and the time of termination of the connection. Other information may also be recorded on the card by any suitable means. A similar card is made in the same way for each terminated connection.

The card punches CP1 and CP2 employed in the present embodiment of the invention are machines of well-known type in which the grounding of combinations of conductors causes the perforation of a card with a corresponding record. A commercially available machine has a capacity of eighty perforations in each of twelve lines which is ample to record the information required in connection with telephone calls. Reference may be had to the patent to T. L. Dowey et al. No. 2,263,291, dated November 18, 1941, for a more complete description of a machine of this kind.

The time-of-day circuit, indicated but not shown in Fig. 9, is a well-known circuit for controlling a recording device by grounding combinations of conductors in accordance with the current time. Reference may be had to the patent to F. E. Blount No. 2,355,903, issued August 15, 1944, for a description of a device of this kind.

Figure 2:
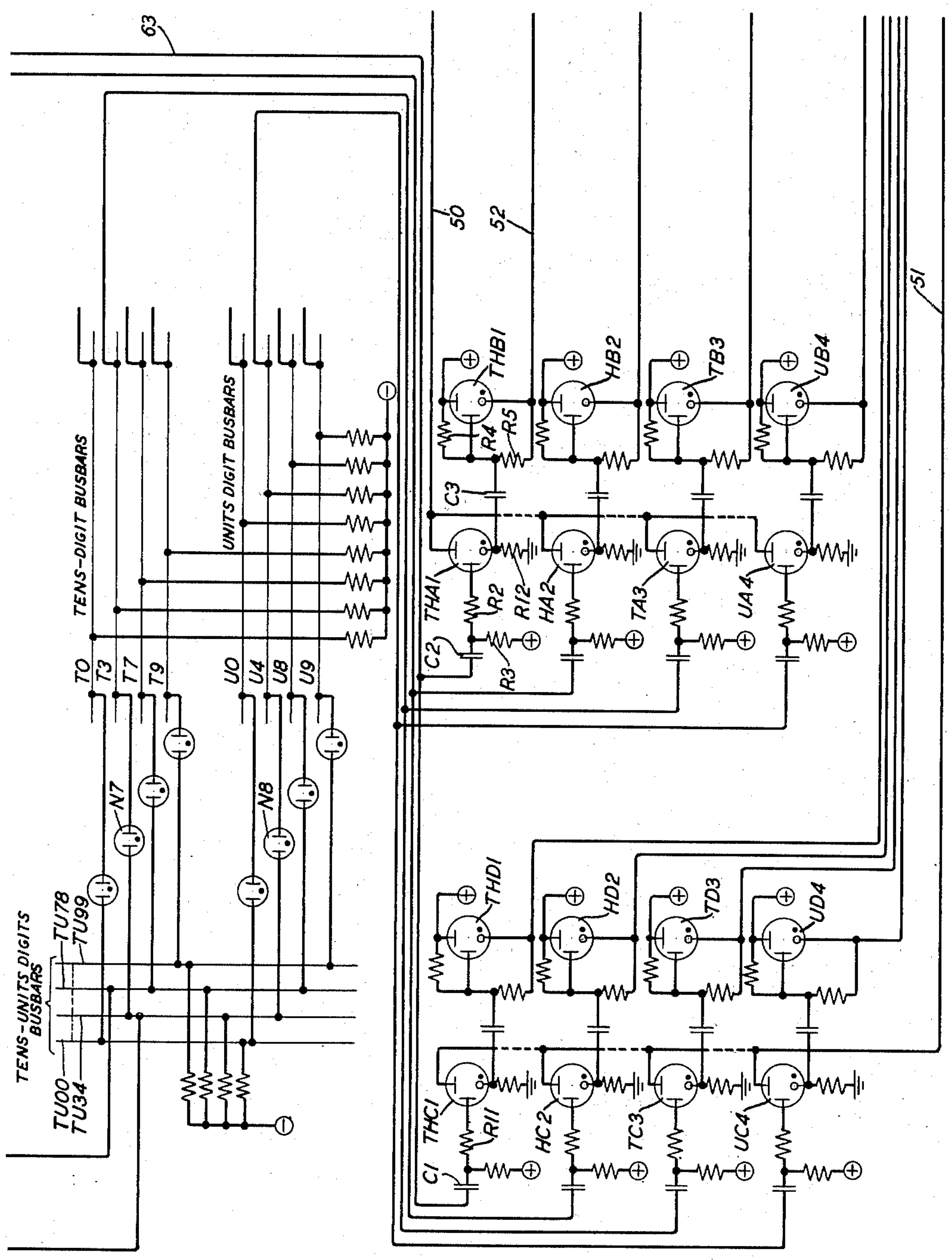
Fig. 2 shows another portion of the calling-line identifier circuit.

As a part of each recording operation, the calling line is identified by the circuits of Figs. 1 and 2. To accomplish this identification, the sleeve conductor of each line which it may be necessary to identify, is connected to one element of each of two diode gas tubes. For example, the sleeve conductor of the line of station A is connected to one element of each of gas tubes N1 and N2 and the sleeve conductor of the line of station B is connected to one element of each of gas tubes N3 and N4. The other element of one of the gas tubes thus associated with each line is connected to one of the common conductors or bus-bars THH00 . . . THH99 in accordance with the thousands and hundreds digits of the directory number of the line. For example, the directory number of the line of station A is assumed to be "1234." The other element of tube N1 is therefore connected to bus-bar THH12 in accordance with the thousands and hundreds digits "12" of said directory number. The directory number of the line of station B is assumed to be "5678." The other element of tube N3 is therefore connected to bus-bar THH56 in accordance with the thousands and hundreds digits "56" of said directory number. The other element of each of the other tubes respectively associated with each line is connected to one of the bus-bars TU00 . . . TU99 in accordance with the tens and units digits of the directory number. Thus, the other element of tube N2 is connected to bus-bar TU34 in accordance with the digits "34" of the directory number of the line of station A and the other element of tube N4 is connected to bus-bar TU78 in accordance with the digits "78" of the directory number of the line of station B.

While it is desirable to connect the elements of tubes N1, N2, N3 and N4 to the bus-bars in accordance with the directory numbers of the lines with which they are associated so that said directory numbers will be indicated and later recorded, it is obvious that said tubes may be connected, if desired, in accordance with any other numbers assigned as designations of the lines.

Each of the bus-bars THH00 . . . THH99 is connected to one element of each of two diode gas tubes, such as tubes N5 and N6. The other element of one of said tubes, for example, tube N5 is connected to one of the bus-bars TH0 . . . TH9 in accordance with the associated thousands digit. Thus, the other element of tube N5 is connected to bus-bar TH1 in accordance with the thousands digit "1." The other element of the other tube associated with each bus-bar, for example, tube N6, is connected to one of the bus-bars H0 . . . H9 in accordance with the associated hundreds digit. Thus, the other element of tube N6 is connected to bus-bar H2 in accordance with the hundreds digit "2." Each of the bus-bars TU00 . . . TU99 is connected to one element of each of two diode gas tubes, such as tubes N7 and N8. The other element of one of said tubes, for example, tube N7, is connected to one of the bus-bars T0 . . . T9 in accordance with the associated tens digit. Thus, the other element of tube N7 is connected to bus-bars T3 in accordance with the tens digit "3." The other element of the other of said tubes is connected to one of the bus-bars U0 . . . U9 in accordance with the associated units digit. Thus, the other element of tube N8 is connected to bus-bar U4 in accordance with the units digit "4." Each of said bus-bars is supplied with negative potential through a resistance, such as resistance R1 for bus-bar THH00, but said potential is insufficient to cause any of said gas tubes to conduct unless positive potential is also supplied to said tubes to create sufficient potential difference between the two elements of the tubes.

With each of the bus-bars TH0 . . . TH9, H0 . . . H9, T0 . . . T9, and U0 . . . U9 is associated two indicating circuits each comprising two triode gas tubes. For example, one indicating circuit comprising tubes THA1 and THB1 and another indicating circuit comprising tubes THC1 and THD1 are associated with bus-bar TH1 over conductor 63. The anodes of all the first tubes THA1, HA2, TA3, UA4, etc. of the first indicating circuits are connected over conductor 50 to the cathode of the pulsing tube P1 and the anodes of all the first tubes THC1, HC2, TC3, UC4, etc. of the second indicating circuits are connected over conductor 51 to the cathode of the pulsing tube P2.

The starting element of each of the first tubes of each indicating circuit, for example tube THA1, is biased by positive battery through resistances R2 and R3, but said bias is not sufficient to cause said tube to conduct even if the anode of said tube is supplied with positive potential, unless the starting element is made more positive. The anode of each of the second tubes of each indicating circuit, for example tube THB1, is supplied with positive potential directly, while the cathode is supplied with negative potential through the winding of relay ATH1 and conductor 52. The potential difference between the anode and cathode of said tube is sufficient to maintain conduction in said tube but insufficient to initiate conduction. The starting element of said tube is positively biased by potential from the voltage divider composed of resistances R4 and R5 but said bias is insufficient to initiate conduction in said tube.

The anodes of the pulsing tubes P1 and P2 are supplied with alternating potential from the source PS but the grids of said tubes are biased by negative battery through resistances R6 and R7, respectively, so that said tubes do not normally conduct. However, the potentials of the grids of said tubes are momentarily and repeatedly raised, by any suitable means, so that each of said tubes momentarily and repeatedly conducts. Reference may be had to the Patent No. 2,484,612, dated October 11, 1949, for a description of a suitable means for actuating said pulsing tubes.

For a clear understanding of the invention, the operation of the circuits in recording information in connection with a call from station A will now be described. It will be assumed that the directory number of the line of station A is "1234" and that the number dialed at said station is "1234567." When the receiver is removed at station A, the primary line-link switch PLL and the secondary line-link switch SLL operate in the usual manner, extending the conductors of the line of station A to the district junctor of Fig. 3. Relay S operates over a circuit extending from battery through the lower winding of said relay, conductor 55, No. 2 contacts of secondary line-link switch SLL, No. 2 contacts of primary line-link switch PLL, switch-hook contacts of station A, No. 1 contacts of primary line-link switch PLL, No. 1 contacts of secondary line-link switch SLL, conductor 56, and upper winding of relay S to ground. When the number "1234567" is dialed at station A, said number is registered by the operation of the register switches RA, RB, RC, RTH, RH, RT and RU of the sender in the usual manner. Reference may be had to the patent to W. W. Carpenter No. 2,093,117 for a more complete description of the means for registering the number dialed and the operation thereof. The No. 1 contacts of register switch RA, the No. 2 contacts of register switch RB, the No. 3 contacts of register switch RC, the No. 4 contacts of register switch RTH, the No. 5 contacts of register switch RH, the No. 6 contacts of register switch RT, and the No. 7 contacts of register switch RU are thereby closed. Upon completion of said registration, when relay STL of the sender (shown, for convenience, in Fig. 7) operates in the usual manner, a circuit is completed from battery through the contacts of relay A1, upper winding of relay PS1, No. 2 contacts of relay AST, and No. 2 contacts of relay STL to ground, over which relay PS1 operates. Relay PS1 is associated with a group of five senders comprising the sender, parts of which are shown in Figs. 12 and 13. Relays PS2 . . . PS5 are associated with other groups of senders. Relay A1 then operates over a circuit extending from battery through the winding of said relay, No. 21 front contacts and winding of relay PS1, No. 2 contacts of relay AST, and No. 2 contacts of relay STL to ground. The contacts of relay A1 remove operating battery from relays PS2 . . . PS5. Relay SS1 operates over a circuit extending from battery through the contacts of relay A2, upper winding of relay SS1, conductor 57, No. 10 contacts of relay PS1, No. 1 contcats of relay AST, and No. 2 contacts of relay STL to ground. Relay SS1 is associated with the sender, portions of which are shown. Relays SS2 . . . SS5 are associated with the other senders of the same group. Relay A2 then operates over a circuit extending from battery through the winding of said relay, No. 4 front contacts and lower winding of relay SS1 to the above-traced ground on conductor 57. The contacts of relay A2 remove operating battery from relays SS2 . . . SS5.

By the operation of relay SS1, conductor 58 to the card punch CP1 is grounded through No. 5 contacts of said relay, starting the operating mechanism of said card punch to perforate a card. When pulsing tube P1 now momentarily conducts, positive potential is supplied from the cathode of said tube over conductor 50 to the anodes of tubes THA1, HA2, TA3, UA4, etc. and positive potential is also supplied from the junction of resistances R9 and R10 over conductor 60, No. 3 contacts of relay SS1, conductor 61, No. 5 contacts of relay PS1, No. 1 contacts of relay STL, conductor 62, No. 3 contacts of secondary line-link switch SLL, and No. 3 contacts of primary line-link switch PLL to one element of each of the tubes N1, N2, causing said tubes to conduct. By the conduction of tube N1, the potential of bus-bar THH12 is raised so that tubes N5 and N6 conduct. By the conduction of tube N5, the potential of bus-bar TH1 and conductor 63 is suddenly raised and a positive pulse is produced from condenser C1 through resistance R11 to the starting element of tube THC1. Said potential, however, has no material effect since the anode of said tube is not supplied with potential. However, a positive pulse is also produced from condenser C2 through resistance R2 to the starting element of tube THA1 and, the anode of said tube being supplied with positive potential, as described above, said tube conducts said anode potential through the anode-cathode space of said tube and resistance R12 to ground. The potential of the cathode of said tube is thereby suddenly raised and a positive pulse produced from condenser C3 to the starting element of tube THB1, which thereupon conducts over a circuit extending from positive battery through the anode-cathode space of said tube, conductor 52, lower normal contacts and winding of relay ATH1 to negative battery, operating relay ATH1, which locks up through its lower front contacts and conductor 65 to ground in card punch CP1. The opening of the lower normal contacts of relay ATH1 removes potential from the cathode of tube THB1 which thereupon ceases to conduct.

By the conduction of tube N6, tubes HA2 and HB2 are similarly actuated and relay AH2 operated and locked up. In a similar manner, by the conduction of tubes N2, N7 and N8, tubes TA3, TB3, UA4, and UB4 are actuated and relays AT3 and AU4 operated and locked up. By the operation of relays ATH1, AH2, AT3 and AU4, conductors 66, 67, 68 and 69 to card punch CP1 are grounded through No. 1 contacts of said relays, operating corresponding punch selectors in said card punch to perforate the card with a corresponding record of the number "1234," which is the directory number of the line of station A.

By the operation of relays PS1 and SS1, a circuit is completed from battery through the winding of relay MC, conductor 70, No. 20 contacts of relay PS1, conductor 71, and No. 2 contacts of relay SS1 to ground, over which relay MC operates, connecting conductors from the register switches of the sender to card punch CP1. Conductors 73, 74, 75, 76, 77, 78, and 79 corresponding to the number "1234567" dialed at station A are thereby grounded through closed contacts of the register switches, causing the card punch CP1 to perforate the card with a corresponding record.

Other conductors, grounded at the moment by the time-of-day circuit T, cause the card punch CP1 to perforate in the card a record of the current time.

When the card punch CP1 has completed its cycle of operations in perforating the card, it removes ground, by any suitable means, from conductor 65, opening the locking circuits of and releasing relays ATH1, AH2, AT3 and AU4, and grounds conductor 80. Relay AST then operates over a circuit extending from battery through the winding and No. 3 normal contacts of said relay, No. 15 contacts of relay PS1, conductor 81, No. 1 contacts of relay SS1, and conductor 80 to said ground, and locks up through its No. 3 front contacts and No. 2 contacts of relay STL to ground. The operating circuits of relays PS1, A1, SS1 and A2 are thereby opened and said relays released. Relays A1 and A2 are made slow to release to ensure that operating battery is not restored to the relays PS1 . . . PS5 and SS1 . . . SS5 until relays PS1 and SS1 have released. By the release of relays PS1 and SS1 the circuit of relay MC is opened and said relay released. By the release of relay SS1 ground is removed from conductor 58 to card punch CP1, arresting the operation of said card punch which is now in condition to perforate another card.

Relays S1, CS, CH, ST and I are the relays ordinarily provided in the district junctor circuit and operate in the usual manner. When the called subscriber answers and the charge relay CH operates, a circuit is completed from battery through the winding of relay PST, No. 1 back contacts of relay ANS, and No. 3 contacts of relay CH to ground over which relay PST operates. Relay PD0 associated with a group of district junctors of which the junctor used by station A is one, then operates over a circuit extending from battery through contacts of relay A3, upper winding of relay PD0, conductor 82, and contacts of relay PST to ground. Relay A3 operates over a circuit extending from battery through the winding of said relay, lower winding of relay PD0, conductor 82, and contacts of relay PST to ground, its contacts removing operating battery from relays PD1 . . . PD9 associated with other groups of district junctors. A circuit is thereby completed from battery through contacts of relay A4, upper winding of relay SD0, conductor 83, No. 10 contacts of relay PD0, conductor 84, and contacts of relay PST to ground, over which relay SD0 operates. Relay A4 operates over a circuit extending from battery through the winding of said relay, No. 3 front contacts and lower winding of relay SD0, to the above-traced ground on conductor 83, the contacts of relay A4 removing operating battery from relays SD1 . . . SD9 associated with other district junctors of the group. By the operation of relay SD0, conductor 85 to card punch CP2 is grounded through No. 4 contacts of said relay, starting the mechanism of said card punch.

When pulsing tube P2 now conducts, supplying, from its cathode, positive potential to the anodes of tubes THC1, HC2, TC3, UC4, etc., positive potential from the junction of resistances R13 and R14 over conductor 86, No. 2 contacts of relay SD0, conductor 87, No. 30 contacts of relay PD0, conductor 62, No. 3 contacts of secondary line-link SLL and No. 3 contacts of primary line-link PLL is also supplied to tubes N1 and N2, causing said tubes to conduct. This actuates tubes THC1, THD1, HC2, HD2, TC3, TD3, UC4 and UD4 in the manner previously described for tubes THA1, THB1, HA2, HB2, TA3, TB3, UA4 and UB4 and, in turn, relays BTH1, BH2, BT3 and BU4 are operated. Tubes THA1, HA2, TA3, and UA4 are not now affected by the positive pulse applied to their starting elements, since their anodes are not supplied with potential.

Relays BTH1, BH2, BT3, and BU4 lock up through their No. 1 contacts and conductor 88 within bracket 89 to ground in card punch CP2. The No. 2 contacts of said relays ground conductors 90, 91, 92 and 93, corresponding to the number "1234," to card punch CP2 causing said card punch to perforate a card with a corresponding record. The number thus recorded is the directory number of the line of station A. The conductors to card punch CP2, grounded at the moment by the time-of-day circuit T, also cause said card punch to perforate the card with a record of the time of answer of the called subscriber.

When the card punch CP2 has completed its operations of perforating a card, it removes ground by any suitable means from conductor 88, releasing relays BTH1, BH2, BT3, and BU4, and grounds conductor 95. Relay RE then operates over a circuit extending from battery through the winding of said relay, conductor 96, No. 20 contacts of relay PD0, conductor 97, No. 1 contacts of relay SD0, and conductor 95 to said ground in card punch CP2. Relay ANS operates over a circuit extending from battery through the winding and No. 3 normal contacts of said relay, No. 1 back contacts of relay AUX, and front contacts of relay RE to ground, and locks up through its No. 3 front contacts and No. 3 contacts of relay CH to ground, its No. 1 back contacts opening the circuit of and releasing relay PST. The circuits of relays PD0, A3, SD0 and A4 are thereby opened and said relays released. Relays A3 and A4 are made slow to release for the same purpose as described in connection with relays A1 and A2. By the release of relay SD0, ground is removed from conductor 85 to card punch CP2, arresting the operation of said card punch, and the circuit of relay RE is opened, releasing said relay. Relay AUX now operates over a circuit extending from battery through the winding and No. 2 normal contacts of said relay, No. 2 contacts of relay ANS, and back contacts of relay RE to ground, and locks up through its No. 2 front contacts and No. 3 contacts of relay CH to ground.

When the calling subscriber replaces the receiver at station A at the termination of the conversation, the circuit of relay S is thereby opened and said relay released. Relay S1 being released at this time, relay PST reoperates over a circuit extending from battery through the winding of said relay, No. 1 front contacts of relay ANS, No. 1 contacts of relay TER, No. 2 contacts of relay CH, No. 2 contacts of relay S1, and contacts of relay S to ground, resulting in a repetition of the operations described above for the answer record, card punch CP2 perforating another card with a record of the number "1234" and the time of disconnection. When at the completion of these operations, card punch CP2 again grounds conductor 95, relay RE again operates over the circuit previously traced. Relay TER then operates over a circuit extending from battery through the winding and No. 2 normal contacts of said relay, No. 1 front contacts of relay AUX, and front contacts of relay RE to ground and locks up through its No. 2 front contacts and No. 3 contacts of relay CH to ground. The No. 1 contacts of relay TER open the circuit of and release relay PST which releases relays PD0, A3, SD0 and A4, thereby arresting the operation of the card punch CP2, and opening the circuit of and releasing relay RE. When relay CH releases, the locking circuits of relays ANS, AUX, and TER are thereby opened and said relays released.

For the call made by station A, three cards are thus made, the first containing a record of the directory number of the calling line, the number of the called station, and the time, and the other two each containing the directory number of the calling line and the time. These cards contain the essential information required for billing the charges for the call and may always be associated by reference to the directory number of the calling line contained in each and the record of the time when each was made. It will be understood that calls from other stations, such as station B, and calls made in connection with other district junctors and other senders not shown are similarly recorded.

While it is convenient to employ two card punches CP1 and CP2 in order that a card relating to the initiation of a call may be made at the same time as another card relating to the answer or disconnection of another call, it is obvious that one card punch, for example card punch CP1, may perform these functions successively, if desired.

What is claimed is:

1. In a telephone system adapted for the automatic production of a plurality of cards for each completed telephone connection, in combination with a calling line having a distinguishing designation, a called line, and means for establishing a talking connection therebetween, means responsive to the establishment and the termination of said talking connection, means responsive to said last-mentioned means for making a plurality of cards therefor, said means comprising means for applying impulses to said calling line, electronic devices responsive to said impulses for determining the designation of said line, recording means, and means responsive to the operation of said electronic devices for controlling said recording means, thereby to record said designation in each of said cards.

2. In a telephone system adapted for the automatic production of a plurality of cards for each completed telephone connection, in combination with calling lines each having a distinguishing designation and called lines, means responsive to the establishment and the termination of a talk-connection between any one of said calling lines and one of said called lines, means responsive to said last-mentioned means for making a plurality of cards for said connection, said means comprising gas-discharge devices individual to said calling line, other gas-discharge devices common to all of said calling lines, recording means, means for applying an impulse to said calling line whereby the gas-discharge devices individual thereto and certain of said common gas- discharge devices are actuated to determine the designation of said calling line, and means responsive to said actuated common gas-discharge devices for controlling said recording means, thereby to record the designation of said calling line in each of said cards.

3. In a telephone system adapted for the automatic production of a plurality of cards for each completed telephone connection, in combination with calling lines, each having an individual designation composed of digits, called lines, and means for establishing talking connections between calling lines and called lines, means responsive to the establishment and the termination of a talking connection between any one of said calling lines and one of said called lines means responsive to said last-mentioned means for making a plurality of cards for said connection, said means comprising first gas-discharge devices individual to said calling line, second gas-discharge devices common to all of said calling lines, third gas-discharge devices for each of said digits, means for applying impulses to said calling line whereby said first gas-discharge devices and certain of said second and third gas-discharge devices are actuated to determine each of the digits of the designation of said calling line, recording means, and means responsive to said actuated third gas-discharge devices for controlling said recording means, thereby to record the designation of said calling line in each of said cards.

4. In a telephone system adapted for the automatic production of a plurality of cards for each completed telephone connection, in combination with a calling line having an individual designation, a called line, and means for establishing a talking connection between said calling line and said called line, means responsive to the initiation, the establishment and the termination of said talking connection, means responsive to said last-mentioned means for making a plurality of cards for said talking connection, said talking means comprising means for applying impulses to said calling line upon the initiation, upon the establishment, and upon the termination of said talking connection, gas-discharge devices responsive to said impulses for determining the designation of said calling line, recording means, and means responsive to said actuated gas-discharge devices for controlling said recording means, thereby to record said calling line designation in each of said cards.

5. In a telephone system adapted for the automatic production of a plurality of cards for each completed telephone connection, in combination with calling lines each having a distinguishing designation composed of digits, called lines, and means for establishing talking connections between calling lines and called lines, means responsive to the initiation, the establishment, and the termination of a talking connection between any one of said calling lines and one of said called lines, means responsive to said last-mentioned means for making a plurality of cards for said connection, said means comprising means for applying impulses to said calling line upon the initiation, the establishment and the termination of said connection, first gas-discharge devices individual to said calling line and responsive to said impulses, second gas-discharge devices common to all of said calling lines and responsive to said first gas-discharge devices, third gas-discharge devices for each of said digits responsive to said second gas-discharge devices for determining the digits of the designation of said calling line, recording means, and means responsive to said actuated third gas-discharge devices for controlling said recording means, thereby to record said calling line designation in each of said cards.

6. In a telephone system, in combination with a calling line having a directory number, a called line, means for extending said calling line to said called line, means individual to said calling line operative in succession over said calling line extension upon the partial establishment of said connection, upon the answer of said called line and upon the restoration of said calling line, means responsive to each operation of said last-mentioned means for registering the directory number of said calling line, means for indicating time, a first recording means, means effective on the partial establishment of said connection for connecting said registering means and said time indicating means to said first recording means, thereby to cause the operation of said first recording means to record on a first card the directory number of said calling line and current time, a second recording means, means operative in response to said called line when answering said connection for connecting said registering means and said time indicating means to said second recording means, thereby to cause the operation of said second recording means to record on a second card the directory number of said calling line and the time when said connection was answered, and means effective on the restoration of said calling line for again connecting said registering means and said time indicating means to said second recording means, thereby to cause the operation of said second recording means to record on a third card the directory number of said calling line and the time when said connection is terminated.

7. In a telephone system, in combination with a calling line and a called line, each of said lines having a distinguishing designation, means for extending said calling line to said called line, means individual to said calling line operative in succession over said calling line extension upon the partial establishment of said connection, upon the answer of said called line and upon the restoration of said calling line, means responsive to each operation of said last-mentioned means for registering the distinguishing designation of said calling line, means responsive to impulses transmitted from said calling line indicative of the distinguishing designation of said called line, means responsive to said last-mentioned means for registering said called line distinguishing designation, means for indicating time, a first recording means, means effective upon the partial establishment of said connection for connecting said calling line registering means, said called line registering means and said time indicating means to said first recording means, thereby to cause the operation of said first recording means to record on a first card the designation of said calling line, the designation of said called line and the indication of current time, a second recording means, means operative in response to said called line when answering said connection for connecting said calling line registering means and said time indicating means to said second recording means, thereby to cause the operation of said second recording means to record on a second card the designation of said calling line and the time when said connection was answered, and means effective on the restoration of said calling line to release said connection for again connecting said calling line registering means and said time indicating means to said second recording means, thereby to cause the operation of said second recording means to record on a third card the designation of said calling line and the time when said connection is terminated.

8. In a telephone system, in combination with a calling line and a called line, each of said lines having a distinguishing designation comprising characters indicating the office in which the line terminates and a directory number, means for extending said calling line to said called line, means individual to said calling line operative in succession over said calling line extension upon the partial establishment of said connection, upon the answer of said called line and upon the restoration of said calling line, means responsive to each operation of said last-mentioned means for registering the directory number of said calling line, means responsive to impulses transmitted from said calling line indicative of the office and directory number of said called line, means responsive to the operation of said last-mentioned means for registering the office and directory number of said called line, means for indicating time, a first recording means, means effective upon the partial establishment of said connection for connecting said calling line registering means, said called line registering means and said time indicating means to said first recording means, thereby to cause the operation of said first recording means to record on a first card the directory number of said calling line, the office and directory number of said called line and the indication of current time, a second recording means, means operative in response to said called line when answering said connection for connecting said calling line registering means and said time indicating means to said second recording means, thereby to cause the operation of said second recording means to record on a second card the designation of said calling line and the time when said connection was answered, and means effective on the restoration of said calling line to release said connection for again connecting said calling line registering means and said time indicating means to said second recording means, thereby to cause the operation of said second recording means to record on a third card the directory number of said calling line and the time when said connection is terminated.

JOSEPH W. DEHN.
EDWARD VROOM.

REFERENCES CITED

The following references are of record in the file of this patent:

UNITED STATES PATENTS

| Number | Name | Date |
|---|---|---|
| 1,927,556 | Nelson | Sept. 19, 1933 |
| 1,943,130 | McPherson | Jan. 9, 1934 |
| 2,165,924 | Goodrum | July 11, 1939 |
| 2,252,766 | Holden | Aug. 19, 1941 |
| 2,270,246 | Bascom et al. | Jan. 20, 1942 |
| 2,272,311 | Sigo | Feb. 10, 1942 |
| 2,272,475 | Ostline | Feb. 10, 1942 |
| 2,273,165 | Wright | Feb. 17, 1942 |
| 2,297,365 | Ostline | Sept. 29, 1942 |
| 2,306,729 | Holden | Dec. 29, 1942 |
| 2,351,551 | Seibel | June 13, 1944 |
| 2,369,868 | Taylor et al. | Feb. 20, 1945 |
| 2,373,908 | Ostline | Apr. 17, 1945 |